(12) United States Patent
Liebe et al.

(10) Patent No.: US 7,431,244 B2
(45) Date of Patent: Oct. 7, 2008

(54) DEVICE FOR THE GENERATION OF EDDIES AND METHOD FOR OPERATING OF SAID DEVICE

(75) Inventors: Roland Liebe, Monheim (DE); Wolfgang Liebe, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 136 days.

(21) Appl. No.: 10/523,512

(22) PCT Filed: Aug. 12, 2003

(86) PCT No.: PCT/DE03/02721

§ 371 (c)(1),
(2), (4) Date: Feb. 4, 2005

(87) PCT Pub. No.: WO2004/020841

PCT Pub. Date: Mar. 11, 2004

(65) Prior Publication Data

US 2006/0102799 A1    May 18, 2006

(30) Foreign Application Priority Data

Aug. 14, 2002   (DE) .............................. 102 37 341

(51) Int. Cl.
*B64C 23/06* (2006.01)
(52) U.S. Cl. ............. 244/199.1; 244/204.1; 239/214.21
(58) Field of Classification Search ................ 244/199, 244/199.3, 201, 204.1, 53 B; 239/214.21, 239/214.23; 405/80; 137/561 A; 138/40, 138/43; 216/93

See application file for complete search history.

(56) References Cited

U.S. PATENT DOCUMENTS

| 2,740,596 | A | * | 4/1956 | Lee ........................... 244/204.1 |
| 2,813,708 | A | * | 11/1957 | Frey ............................. 165/9.3 |
| 2,878,831 | A | * | 3/1959 | Farnham et al. ......... 137/601.09 |
| 3,241,771 | A | * | 3/1966 | Erwin .................... 239/265.25 |
| 3,475,108 | A |   | 10/1969 | Zickuhr |
| 3,986,787 | A | * | 10/1976 | Mouton et al. .................. 415/7 |
| 4,058,141 | A | * | 11/1977 | Hasinger et al. .............. 138/39 |
| 4,667,900 | A | * | 5/1987 | Kim ........................... 244/53 B |
| 4,844,382 | A | * | 7/1989 | Raisbeck .................. 244/53 B |
| 5,486,091 | A |   | 1/1996 | Sharma |

(Continued)

FOREIGN PATENT DOCUMENTS

CH       652 452  A5   11/1985

(Continued)

OTHER PUBLICATIONS

F. Didier, R. Dénos, T. Arts, "Unsteady Rotor Heat Transfer in a Transonic Turbine Stage", ASME Turbo Expo 2002, GT-2002-30195, Jun. 3-6, 2002, pp. 319-329, Netherlands.

(Continued)

*Primary Examiner*—Tien Dinh

(57) ABSTRACT

According to the invention, a device for the generation of eddies creates or destroys eddies in a flowing medium in a particularly simple manner, with particularly low energy requirement with the lowest possible pressure drop, whereby the device comprises one or more profiles, for the flowing medium to flow around, which are provided with an external drive for a periodic movement relative to the flowing medium with an angular frequency $\omega$. The profiles are thus periodically displaced with an angular frequency $\omega$ by an external drive.

8 Claims, 7 Drawing Sheets

U.S. PATENT DOCUMENTS

| | | | |
|---|---|---|---|
| 5,525,269 | A | 6/1996 | Connolly et al. |
| 2005/0142001 | A1* | 6/2005 | Cornell ..................... 417/245 |

FOREIGN PATENT DOCUMENTS

| | | |
|---|---|---|
| DE | 900 526 | 12/1953 |
| DE | 215 155 | 10/1984 |
| DE | 33 43 296 A1 | 6/1985 |
| EP | 0 517 249 A2 | 12/1992 |
| FR | 2 528 500 A1 | 12/1983 |
| GB | 763359 | 12/1956 |
| JP | 03 160 200 A1 | 7/1991 |

OTHER PUBLICATIONS

Witold Eisner, Drobniak Stanislaw, "The Nonstationary Behaviour of Stator Profile Boundary Layer Excited by Periodic Upstream Wakes", ASME Turbo Expo 2002, GT-2002-30234, Jun. 3-6, 2002, pp. 673-380, Netherlands.

Sang Woo Lee, Sang Bae Jun, Byung-Kyu Park, Joon Sik Lee, "Effects of High Free-Stream Turbulence on the Near-Wall Flow and Heat/Mass Transfer on the Endwall of a Linear Turbine Rotor Cascade", ASME Turbo Expo 2002, GT-2002-30187, Jun. 3-6, 2002, pp. 231-243, Netherlands.

R. Liebe, "Validation of the Finite Vortex Model by Analyzing Unsteady Aerodynamic Experiments", Design and Nature Conference 2002, 10 pages, Italy.

R. Liebe, W. Liebe, "A General Finite Vortex Model to Describe Unsteady Aerodynamics in Nature", Design and Nature Conference 2002, 10 pages, Italy.

W. Heinke, B. Matyschok, B. Stoffel, K. Heinig, A. Fiala, "Numerische Simulation und experimentelle Untersuchungen zum Clocking-Effekt", 7. Seminar of AG Turbo, Dec. 7 & 8, 2000, pp. 11-1 thru 11-12, Germany.

H.-P. Schiffer, F. Haselbach, L. Fottner, "Hochbelastete ungekühlte Turbinenbeschaufelung", 7. Seminar of AG Turbo, Dec. 7 & 8, 2000, pp. 5-1 thru 5-16, Germany.

Liebe, W, "Die Schwingende Hinterkante Als Auftriebshilfe und Zur Verminderung des Widerstands am Tragflügel", DGLR-JT99-088, 1999, pp. 285-290, Germany.

Douglas L. Sondak, Daniel J. Dorney, "Simulation of Vortex Shedding in a Turbine Stage", ASME 98-GT-242, International Gas Turbine & Aeroengine Congress & Exhibition, Jun. 2-5, 1998, pp. 1-10, Sweden.

Peter Freymuth, Karl E. Gustafson, Robert Leben, "Visualization and Computation of Hovering Mode (Vortex Dynamics)", 1991, pp. 143-169, USA.

K. Dullenkopf, A. Schulz, S. Wittig, "Einfluβ periodisch instationärer Zuströmbedingungen auf den zeitlich gemittelten Waärmeübergang an Turbinenschaufeln", 2. Statusseminar der Arbeitsgemeinschaft Hochtemperatur-Gasturbine, Nov. 22 & 23, 1990, pp. 85-97, Germany.

D.R. Poling, D.P.Telionis, "The Response of Airfoils to Periodic Disturbances—The Unsteady Kutta Condition", AIAA Journal, Feb. 1986, pp. 193-199, vol. 24, No. 2, USA.

W.J. McCroskey, L.W. Carr, K.W. McAlister, "Dynamic Stall Experiments on Oscillating Airfoils", AIAA Journal Jan. 1976, pp. 57-63, vol. 14, No. 1, USA.

Wolfgang Liebe, "Der Schwanzschlag der Fische", VDI-Z. 105, Oct. 1963, pp. 1298-1302, Nr. 28, Germany.

* cited by examiner

FIG 3
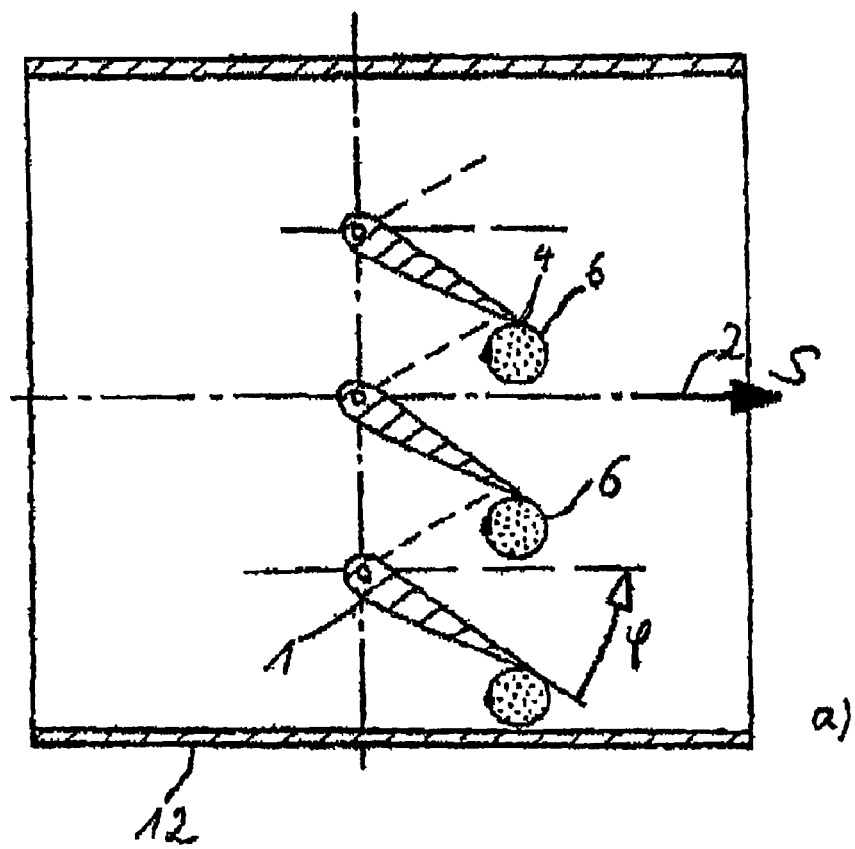
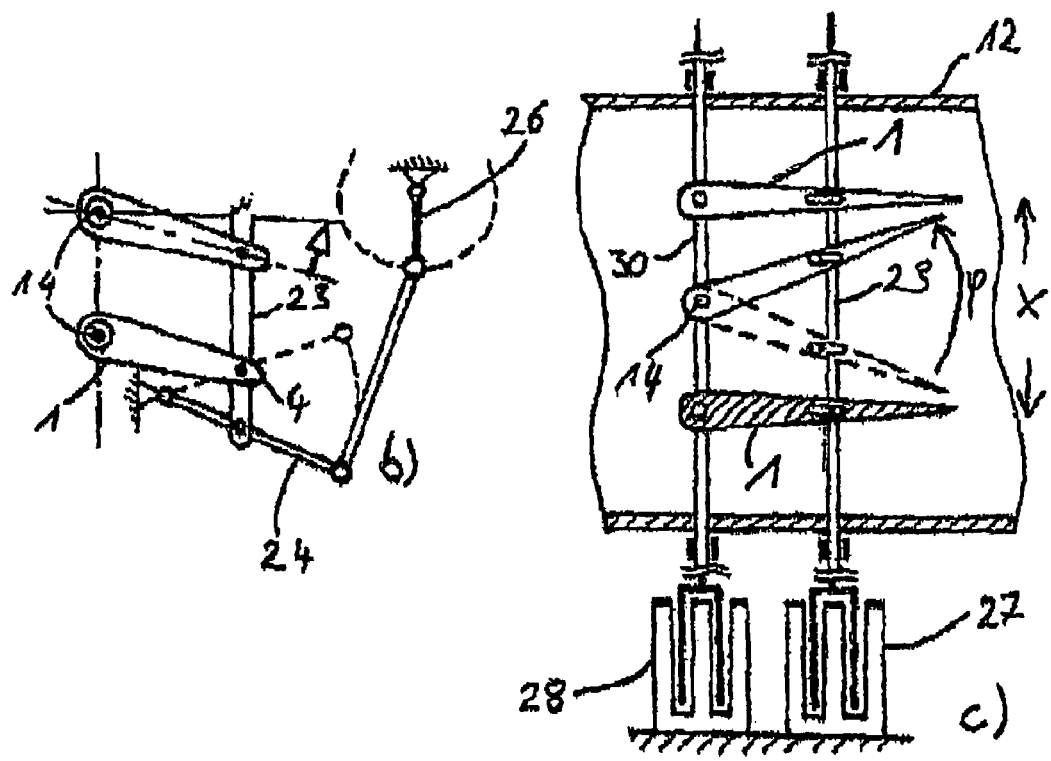

FIG 4
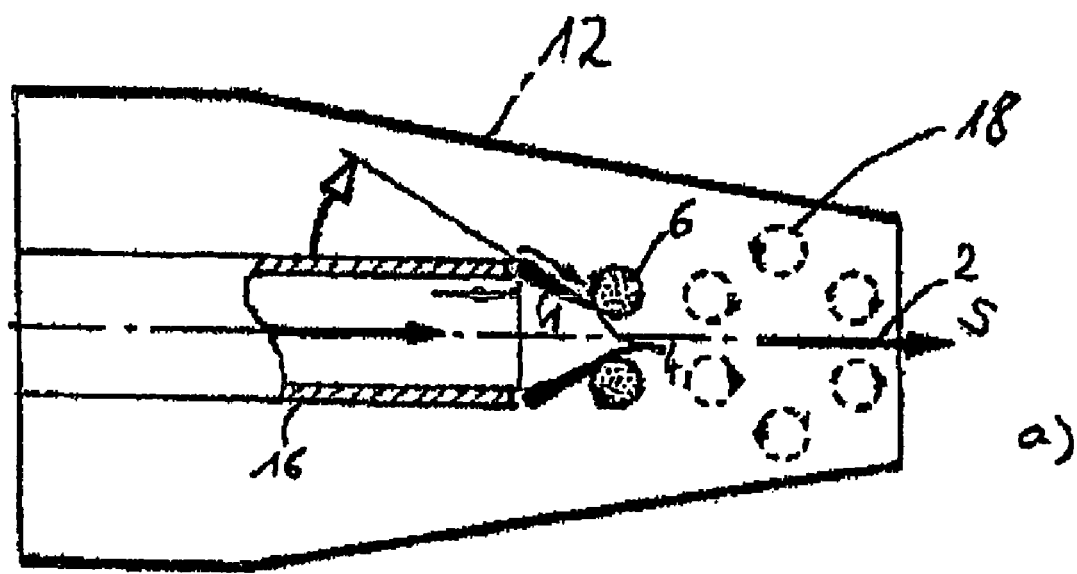
a)
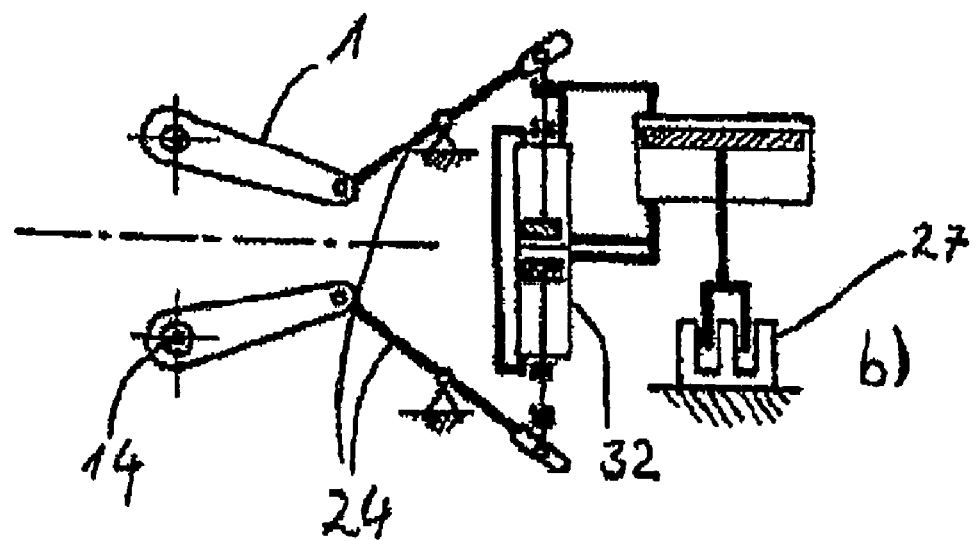
b)

DEVICE FOR THE GENERATION OF EDDIES AND METHOD FOR OPERATING OF SAID DEVICE

CROSS REFERENCE TO RELATED APPLICATION

This application is the US National Stage of International Application No. PCT/DE2003/002721, filed Aug. 12, 2003 and claims the benefit thereof. The International Application claims the benefits of German Patent application No. 10237341.8 DE filed Aug. 14, 2002, both of the applications are incorporated by reference herein in their entirety.

FIELD OF THE INVENTION

The invention relates to a device for the generation and/or destruction of vortices in a flow medium, said device comprising one or more profiles arranged in a flow duct and provided for flow around by the flow medium. It relates, further, to a method especially suitable for operating the device.

BACKGROUND OF THE INVENTION

The controlled generation or destruction of vortices plays an important part in many flow-related applications. Since vortices contain rotational energy and can therefore both absorb and discharge energy, they are used for the controlled transmission of energy from a flow-around profile to the flow medium or into a boundary layer or for the exchange of energy, in particular including heat, or of substances between different regions of a flow.

For the efficient transport of a flow medium, for example, systems are used consisting of stationary vortex generators which transmit energy to the flow medium as a result of the generation of vortices. In this case, it is desirable to keep the pressure loss which the flow medium experiences along the system consisting of vortex generators as low as possible. In particular, the mean mass flow with respect to the pressure loss is to be as high as possible.

Owing to the use of vortex generators in the flow duct, velocity fluctuations can also be imparted to a flow medium. Such velocity fluctuations, which are generated, for example, by means of shockwaves occurring at vortex generators, considerably increase both heat exchange and mass transfer in the flow medium transversely to the flow direction. By virtue of the targeted mounting of vortex generators in the flow duct, an intensified cooling action of the flow on components subjected to especially high thermal load can thus be achieved. In this case, the vortex generators should be positioned and dimensioned in such a way that the heat transmission coefficient in relation to the pressure loss which the flow medium experiences along the system consisting of vortex generators is as high as possible. Thus, for example due to the use of a system consisting of vortex generators in a gas turbine, cooling air can be saved both in the region of the combustion chamber and in the region of the turbine blades, and consequently, with at the same time the efficiency of the gas turbine being increased, its NOx emissions can be lowered.

The intensified mass transfer transversely to the flow direction in a flow medium with velocity fluctuations may be utilized for the intensified mixing of the flow medium. For example, owing to the especially thorough mixing of fuel gas and air in a gas turbine plant, a complete combustion of the fuel gas can be achieved and therefore its NOx emissions can be lowered.

The diversity of technical applications of vortex generators or vortex destroyers means that there is great interest in the theoretical calculation of the occurrence and development of vortices. They are necessary, in particular, in order to configure the shape and positioning of vortex generators and vortex destroyers optimally in terms of their action on a flow medium. The calculation of turbulent flows is conventionally carried out either explicitly by solving the Navier-Stokes equation of the problem, although this is a procedure which is too complex and involves too high an outlay, above all in the case of three-dimensional applications, or else via corresponding models of the classic hydrofoil theory.

Within the framework of the classic hydrofoil theory, admittedly, turbulent flows at components which are rigid, that is to say with a passive flow around and not accelerated, can be described. However, with components which are active, that is to say moved in an accelerated manner, the classic hydrofoil theory falls down. To be precise, it presupposes the smooth flow-off of the flow medium at the trailing edge of the flow-around profile, what is known as the Kutta condition, and also a finite onflow velocity and a quasistatic linear treatment. A breakaway of the flow from the flow-around profile and a rolling-up of vortices which occur, such as takes place in the case of non-stationary flow processes on profiles moved in an accelerated manner, cannot be treated within the framework of the theory. Where technical applications are concerned, therefore, vortex generators with a passive flow around are normally used, which can be described by means of classic aerodynamics. However, vortex generators with a passive flow around have comparatively high dynamic resistances. If they are placed in a flow duct, this therefore results in an undesirably high pressure drop in the flow medium.

SUMMARY OF THE INVENTION

The object on which the invention is based is, therefore, to specify a device for the generation of vortices in a flow medium of the abovementioned type, by means of which, along with as low a pressure drop as possible, vortices can be generated in a flow medium in an especially simple way and at an especially low outlay in energy terms. Furthermore, a method especially suitable for operating the device is to be specified.

As regards the device, this object is achieved, according to the invention, in that the device comprises one or more profiles arranged in a flow duct and provided for flow around by the flow medium, the profiles being provided with a mechanical, electromagnetic or electrohydraulic drive for a periodic movement in relation to the flow medium with an angular frequency $\omega$.

What may be provided as "profiles" in this context are any desired suitably dimensioned and contoured fittings in the flow duct, which, particularly in terms of their shape, are adapted to the flow conditions expected as a consequence of design in the flow duct.

The invention in this case proceeds from the consideration that, for a high efficiency of the vortex generator, the mean throughput of flow medium in relation to its pressure loss along the flow duct should be as high as possible. In order to keep the pressure loss low, the transmission of energy from the vortex generator to the flow medium should consistently be improved. A better transmission of energy can be achieved in that the energy content of the generated vortex is increased. As has become clear, higher energy contents can be achieved by means of active, that is to say accelerated vortex generators, both in laminar and in turbulent flows, in that the vortex is accelerated before its breakaway from the profile of the vortex generator. For especially high efficiency, therefore, vortex generators should be moved in an accelerated manner in relation to the flow duct. A uniform vortex generation which satisfies these requirements can in this case be achieved in an especially simple way by means of a periodic movement of the vortex generator.

In order to understand the processes at periodically moved vortex generators, use can be made of the knowledge that a vortex generated by such a vortex generator and breaking away can be described effectively by means of a spatially limited vortex having a rigid core, what is known as a "finite edge vortex". Such a vortex, immediately after its formation on the trailing edge of the flow-around profile, is filled up by flow medium flowing in toward its center, up to the rest of its progression in time, as a radius a which is assumed to be constant. As a result, the vortex is set in rotation, and its rotational velocity increases further during the subsequent "adhesion phase". In this case, the vortex experiences a net throughflow by flow medium, and the component of the flow from the direction of the profile trailing edge increases up to a maximum value. The vortex, after reaching its stable size, adheres to the profile until this maximum value is reached, and then breaks away.

While the vortex is still adhering to the profile, its rotation induces a tangential flow along the profile surface, what may be referred to as the "sheathing flow". The aerodynamic interaction of the sheathing flow with the onflow of the flow medium onto the profile generates an orthogonal pair of forces, propulsion and resistance. Depending on which of the two forces predominates, the character of the interaction between flow medium and profile changes. Thus, for example in the case of a movement of the profile with a comparatively high frequency, the propulsion character of the interaction predominates and energy is transmitted from the vortex generator to the flow medium, whereas, in the case of the movement with low frequency, the resistance character predominates and energy is transferred from the flow medium to the vortex generator.

These findings within the framework of what is known as the "finite edge vortex model" are utilized when new characteristic quantities are employed. What is suitable as a characteristic quantity describing the propulsion characteristic or resistance characteristic of the flow is the ratio of the flow velocity averaged over a movement period of the profile with respect to the mean cross section of the profile to the maximum flow velocity at the profile trailing edge. If this quantity $f:=v_m/v_{max}$ is between 0.2 and 0.5, the flow has a propulsion character. By contrast, if f is higher than 0.5, it has a resistance character.

The Reynolds' number of the maximum edge flow around, the reduced frequency and the Strouhal number can be used as further important characteristic quantities.

The Reynolds' number of the maximum edge flow around is in this case defined as the product of the maximum flow velocity at the profile trailing edge and the elongation of the flow-around profile, divided by the kinematic viscosity of the flow medium, the reduced frequency is defined as the product of the angular frequency of the periodic movement and elongation of the flow-around profile, divided by the flow velocity averaged over a movement period of the profile with respect to the mean cross section of the profile, and the Strouhal number is defined as the frequency of the periodic movement and the elongation of the flow-around profile, divided by the flow velocity averaged over the movement period of the profile with respect to the mean cross section of the profile. Said characteristic quantities are used instead of the external constant profile onflow velocity employed in classic aerodynamics and permit substantially more differentiated and more realistic characterization of the resulting flow.

Advantageously, the shape, number and size of the profiles are selected such that, when the vortex generator is operating, the quotient of the flow velocity averaged over the movement period of the profile with respect to the mean cross section of the profile and the maximum flow velocity at the profile trailing edge has a predetermined value. In particular, this value may be selected such that, depending on the type of technical application, a flow with a resistance character or with a propulsion character is obtained as a result.

Depending on the technical task to be fulfilled by the vortex generator, different types of periodic movements of the profiles are conceivable and beneficial. Advantageous basic forms of periodic movements are periodic displacements of the profiles perpendicularly to the flow direction of the flow medium, rotations of the profiles about an axis of rotation perpendicularly to the flow direction in the manner of a pivoting through an angle $\phi$, and the rotation of pairs of profiles with the same angular frequency $\omega$ and the same phase about their respective axis of rotation, the axes of rotation being oriented antiparallel to one another, and also periodic displacements of the profiles parallel to the flow direction of the flow medium.

To improve the efficiency of the vortex generator and for adapting it optimally to its technical task, the profiles, if appropriate, execute combinations of said basic forms of the periodic movements. Advantageously, the periodic movement of the profile may consist, in particular, of a combination of a displacement of the profile in relation to the flow duct and of a rotation of the profile about an axis of rotation.

In many applications, it is beneficial to destroy a generated vortex again after it has covered a particular distance in the flow duct. This is the case, for example, when the residual wake energy of the vortex is to be utilized as fully as possible. In such a case, the vortex generator is advantageously followed on the flow medium side by a device for the destruction of vortices.

Since, in the case of low drive power, active vortex generators are capable of transmitting energy and substances in an especially efficient way, they may be used in a multiplicity of technical sectors. In the conveyance of a flow medium through a flow duct or a pipeline, the aim is, for example, to achieve as high a mass flow as possible, with at the same time a low pressure loss in the flow medium. However, the desired increase in the flow velocity of the flow medium, along with a low pressure loss, can be achieved precisely with the aid of an active vortex generator. A device for the active generation of vortices is therefore advantageously arranged in the flow duct of a conveying zone, said device comprising a number of vortex generators which execute a periodic movement with the same angular frequency $\omega$ and the same phase.

Alternatively to this, the phase of the vortex generators may also be opposed, that is to say displaced at 180 degrees with respect to one another.

A further important use of active vortex generators is to increase the efficiency of cascade flows. Cascade flows are employed in order to maximize the mean efficiency of an axial cascade, with at the same time as low a pressure loss as possible. For this purpose, for example, guide vanes precede the moving blades of a gas turbine on the flow medium side. For a further increase in the cascade efficiency, the axial cascade is advantageously preceded on the flow medium side by a device for the active generation of vortices which device comprises a number of profiles which execute a periodic movement with the same angular frequency $\omega$ and the same phase. In particular, periodic flow pulses can thereby be generated, which are optimally coordinated in their period and length with the likewise periodic actual cascade flow. Furthermore, the "clocking effect", as it is known, which increases the efficiency of the cascade and is not yet fully understood theoretically may be utilized, this coming under consideration when individual cascades moved in relation to one another interact with one another.

Velocity fluctuations imparted to a flow medium can be utilized for the especially efficient cooling of components subjected to high thermal load. Such velocity fluctuations can be generated in an especially efficient way by means of active vortex generators and considerably increase both the heat exchange and the mass transfer in the flow medium transversely to the flow direction. Thus, by virtue of the targeted mounting of active vortex generators in the flow duct, an efficient cooling of components subjected to particularly high thermal load can be achieved. For this purpose, a cooling device advantageously comprises a flow duct, a cooling stream conducted through the flow duct and a device which is arranged within the flow duct and which has one or more periodically moved profiles for the active generation of vortices.

Velocity fluctuations imparted to a flow medium also intensify the mass transfer transversely to the flow direction. This effect can be utilized in a controlled manner for the intensified mixing of a flow medium. Especially high mixing quality, with at the same time a low pressure loss, can be achieved in that active vortex generators are used in order to generate the velocity fluctuations. It is usually desirable for the velocity fluctuations imparted to the flow medium by generated vortices to be destroyed again after mixing is concluded. A mixing zone therefore advantageously comprises a device for the active generation of vortices which is followed on the flow medium side by a device for the destruction of vortices.

By means of an active vortex generator, substance and energy streams can be generated and/or intensified in an especially efficient way, with at the same time a low pressure drop within the flow medium, for example during the mixing of fuel gas and air in a compressor or during the cooling of the component subjected to especially high thermal load. The active vortex generator is therefore advantageously used in a gas turbine.

As regards the method, said object is achieved in that one or more profiles arranged in a flow duct and provided for flow around by a flow medium are moved periodically with the angular frequency $\omega$ by means of an external drive.

New findings within the framework of what is known as the "finite edge vortex model" show how it is possible in a controlled manner to influence the imparting of a resistance character or propulsion character of a flow around moved profiles, that is to say the direction of energy transmission between profile and flow medium. An important characteristic quantity within this model is the quotient of the flow velocity averaged over a movement period of the profile with respect to the mean cross section of the profile and the maximum flow velocity at the profile trailing edge. Advantageously, the direction of energy transmission between moved profile and flow medium is set by this quotient. Alternatively, the direction of energy transmission between profile and flow medium can also be set via the product of the maximum flow velocity at the profile trailing edge and of the elongation of the flow-around profile, divided by the kinematic viscosity of the flow medium.

In many technical applications, disadvantages may arise when, as the flow progresses further, generated vortices bring about a comparatively high degree of turbulence of the flow. Advantageously, therefore, the generated vortices are completely or partially destroyed again downstream of the position in the flow duct at which they were generated.

As calculations within the framework of the "finite edge vortex model" have yielded, substance and energy streams can be generated and/or intensified by the use of active vortex generators especially efficiently and with a comparatively low pressure drop within the flow medium. The method for the generation of vortices by means of active vortex generators is therefore especially suitable for various technical applications, for example for the transportation or mixing of flow media, for increasing the efficiency of cascade flows and for the cooling of components subjected to especially high thermal load.

The advantages achieved by means of the invention are, in particular, that vortices can be generated at a comparatively low outlay in energy terms as a result of the use, now provided, of periodically moved vortex generators. The periodic movement of the profiles can in this case be implemented in a comparative simple way in technical terms by the use of an external mechanical, electrical or electrohydraulic drive. When active, in contrast to passive, vortex generators are used, substance and energy streams can be generated and/or effectively intensified in a flow medium, with at the same time especially low pressure losses within the flow medium. The low pressure loss can in this case be attributed to the fact that active vortex generators are characterized by very low resistances.

On account of the beneficial technical properties mentioned, active vortex generators have a multiplicity of application possibilities. Due to the use of active vortex generators, for example, the cascade flow in the compressor of a gas turbine can be configured more efficiently and the clocking effect can be utilized to an increased extent. The cooling of components subjected to thermal load can also be improved by means of active vortex generators, and therefore cooling air can be saved. Furthermore, owing to the use of active vortex generators, a more thorough mixing of, for example, fuel gas and air prior to combustion, for the reduction of NOx emissions, is possible. An increase in the efficiency of the gas turbine and a reduction in its emissions can thus be achieved at a comparatively low outlay in technical terms.

BRIEF DESCRIPTION OF THE DRAWINGS

An exemplary embodiment of the invention is explained in more detail with reference to a drawing in which:

FIG. 3 shows a zone for the transport of a flow medium, said zone comprising a device for the generation of vortices, FIG. 4 shows a further zone for the transport of a flow medium.

DETAILED DESCRIPTION OF THE INVENTION

Identical parts are given the same reference symbols in all the figures.

Figure 1:
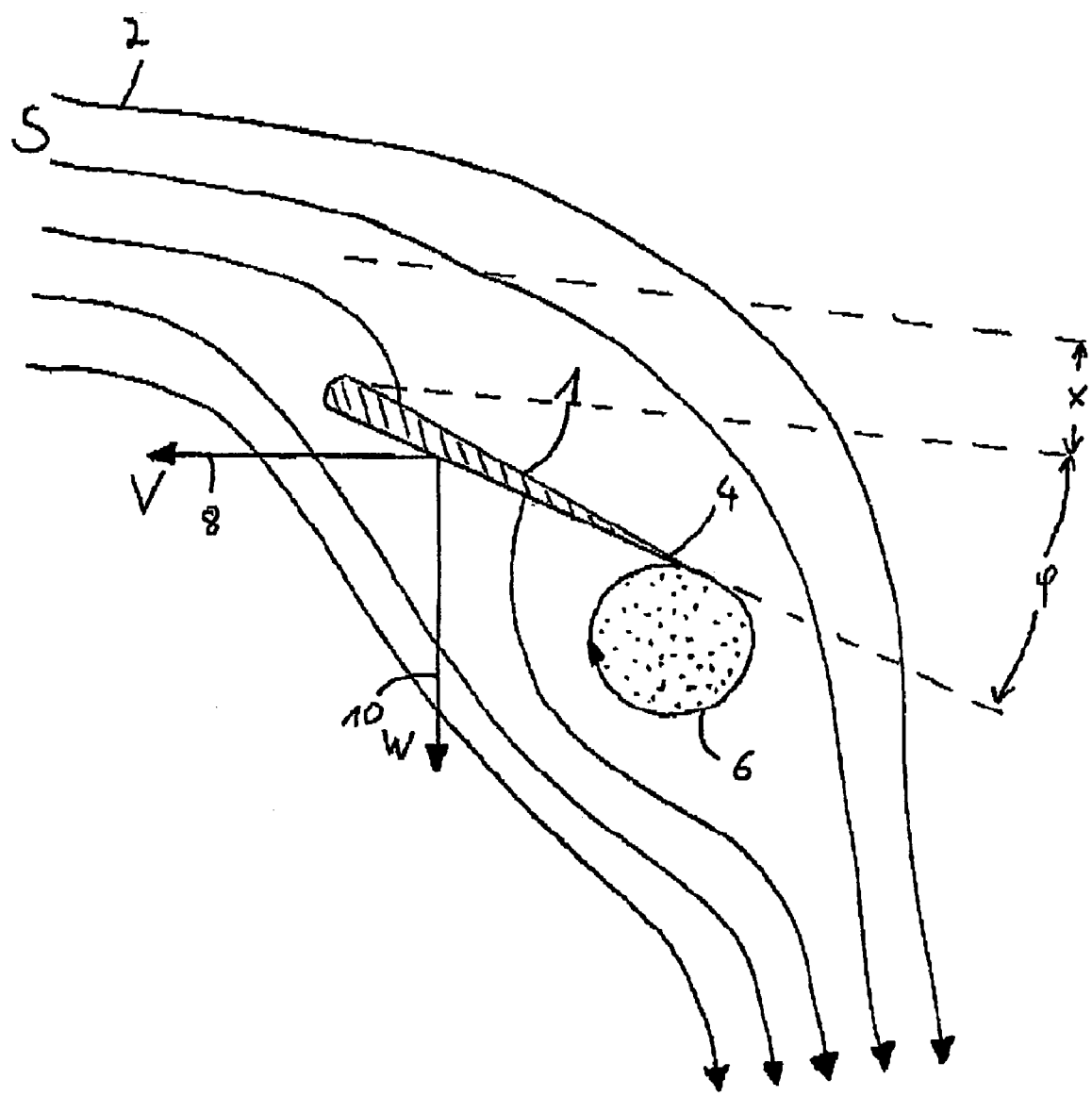
FIG. 1 shows a profile around which a flow medium flows and at the trailing edge of which a vortex is generated.

FIG. 1 shows a device for the generation of vortices by means of a profile 1 around which a flow medium S flows and which may be located, for example, in a flow duct, not illustrated in FIG. 1. The flow direction of the flow medium S is indicated by the arrows 2 in a streamlined manner. The profile 1 can be moved by means of an external drive, not illustrated in FIG. 1, the movement generally being composed of a displacement of the profile 1 over a distance x and of a rotation of the profile 1 through an angle φ. The movement takes place periodically at an angular frequency ω. During the movement of the profile 1 in relation to the flow medium S, two vortices are formed at the trailing edge 4 of the profile 1 during each period of the movement, grow immediately after their formation, adhere to the trailing edge 4 for a short time and then break away.

The vortices which are formed can be described comparatively realistically with the aid of the "finite edge vortex model". Within the framework of this model, vortices formed at the trailing edge 4 of the profile 1 are not described as ideal vortices, but instead as vortices with a sharply defined radius and with a rigidly rotating core. FIG. 1 illustrates such a "finite edge vortex", as it is known, 6. The finite edge vortex 6, immediately after being formed at the trailing edge 4 of the flow-around profile 1, is filled up to its radius a by flow medium S flowing toward its center and is set in rotation. Its rotational velocity increases further during the subsequent "adhesion phase", where the finite edge vortex 6 experiences a net throughflow by flow medium S, and the component of the flow from the direction of the trailing edge 4 increases up to a maximum value. The finite edge vortex 6 breaks away from the trailing edge 4 at the moment at which this maximum value is reached. During the adhesion phase, the rotation of the finite edge vortex 6 induces a tangential flow along the profile surface, what may be referred to as the "sheathed flow". The sheathed flow comes into interaction with the onflowing flow medium S, an orthogonal pair of forces, the propulsion V, indicated by the arrow 8, and the resistance W, indicated by the arrow 10, being obtained.

The character of the interaction between flow medium S and profile 1 depends critically on which of the two forces predominates. As both theoretical investigations within the framework of the "finite edge vortex model" and experimental findings show, in the event of a movement of the profile 1 with relatively high angular frequency ω, the propulsion character of the interaction predominates and energy is transmitted from the profile 1 to the flow medium S. By contrast, in the event of a movement with a low angular frequency ω, its resistance character predominates and energy transmission takes place in reverse from the flow medium S to the profile 1.

In contrast to the classic hydrofoil theory, the relatively simple "finite edge vortex model" makes it possible to describe the flow around a profile 1 moved in an accelerated manner. It thus makes possible the controlled use of active vortex generators, that is to say those which comprise a number of profiles 1 moved in an accelerated manner. In contrast to a rigid profile, a profile 1 moved in an accelerated manner has considerably lower dynamic resistance. In other words: a moved profile 1 gives rise to a considerably lower pressure loss within the flow medium S than a rigid profile. It can thus be used, for example, for the efficient transportation or mixing of flow media S, a comparatively high throughput of flow medium, with at the same time a low pressure loss, being achieved on account of the low dynamic resistance of the profile 1.

Figure 2:
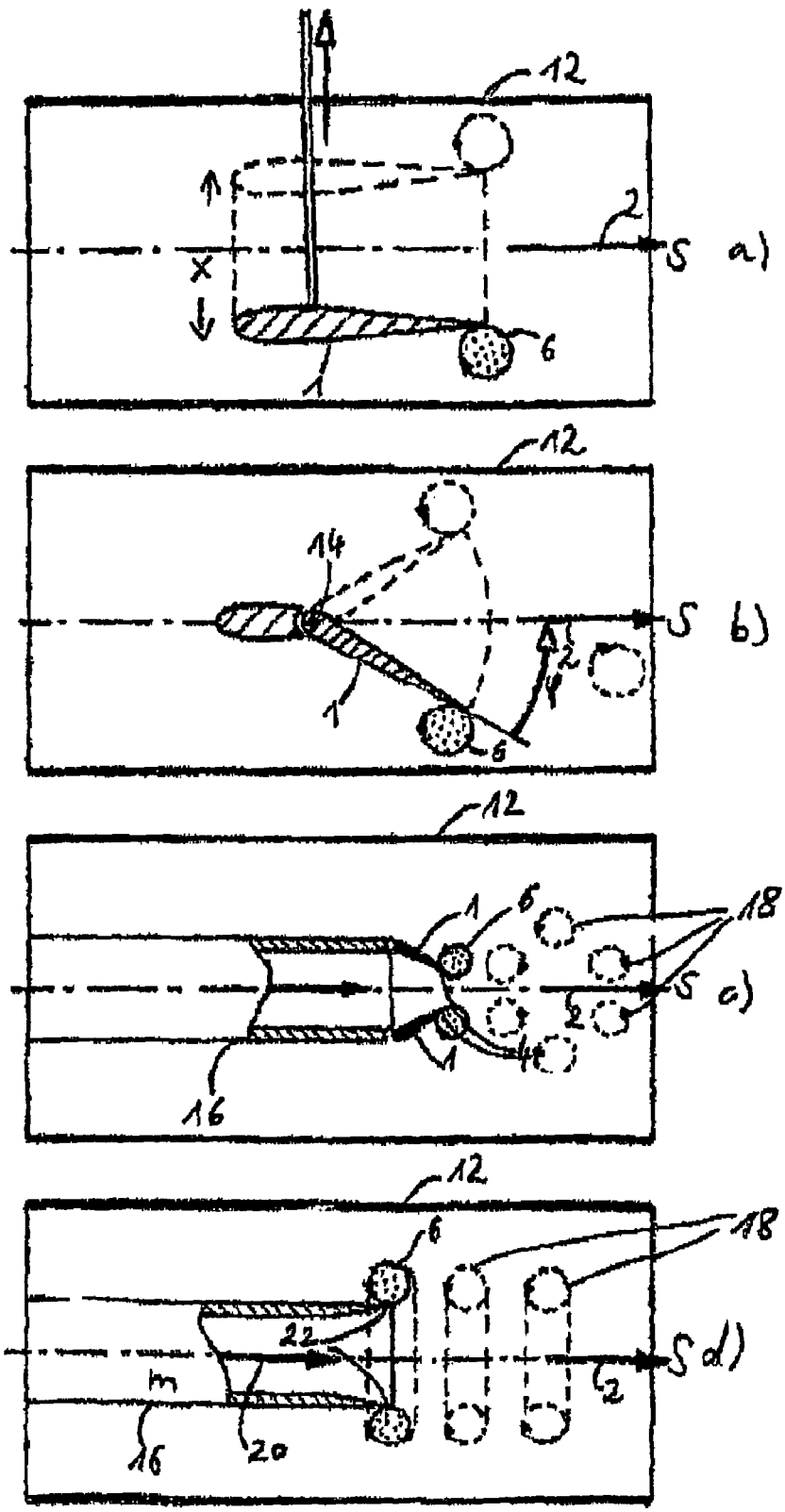
FIG. 2 shows various versions of a device comprising one or more profiles for the generation of vortices in a flow medium.

Various types of periodic movement of the profile 1 may be envisaged. FIG. 2 shows various possibilities for the periodic movement of the profile 1 in relation to the flow medium S. The flow medium S flows through a flow duct 12 in the direction indicated by the arrow 2. As illustrated in FIG. 2a, a finite edge vortex 6 can be generated in the flow medium S, in that a profile 1 is displaced periodically over a distance x perpendicularly to the flow direction, that is to say executes a pure translational movement.

FIG. 2b shows another possibility for the periodic movement of the profile 1, in which the profile 1 executes a pure rotational movement about an axis of rotation 14 perpendicularly to the flow direction through an angle φ. In technical applications, it is advantageous under some circumstances to use combinations of translational and rotational movements. As shown in FIG. 2c, a plurality of profiles 1 may also be employed in order to generate vortices. By means of a configuration, as in FIG. 2c, in which a pair of profiles 1 oscillates in countersynchronism or in synchronism at the exit of a further flow duct 16 arranged in the flow duct 12, for example, two flow media flowing in the flow duct 12 and in the further flow duct 16 can be efficiently intermixed and/or transported. In such an arrangement, in each oscillation period of the profile 1, two pairs of finite edge vortices 6 break away from the profile trailing edges 4 and form what is known as a wake 18 in the flow duct 12. FIG. 2d shows a device for the generation of finite edge vortices 6 without periodically moved components. Here again, a further flow duct 16, through which a flow medium S flows, is arranged within a flow duct 12. However, the flow medium S flows through the further flow duct 16 with a periodic variation of its mass flow m. At the exit 22 of the further flow duct, in each period a pair of finite edge vortices 6 is formed, which breaks away after the adhesion phase and forms a wake 18 in the flow duct 12.

As calculations within the framework of the finite edge vortex model have yielded, the profiles 1 should follow certain rules in their shape and dimensioning. In particular, the profiles 1 should have a sharp trailing edge which is as long as possible, so that the maximum flow velocity at the trailing edge 4 is as high as possible and the finite edge vortex 6 which occurs has a comparatively small radius. A harmonic oscillation form of the profile 1 is not desirable in every case, in order to achieve a long adhesion phase of the finite edge vortex 6 and high propulsion. Depending on the field of use of the vortex generator, the oscillation frequency and amplitude, the position of the axis of rotation 14 during a rotation and the general shape of the profile 1 must be optimized in such a way that optimal energy transmission between profile 1 and flow medium S takes place by means of as low an external drive as possible and with a low pressure drop.

Owing to the favorable properties of the finite edge vortices 6, their generation can be utilized, for example, for the transportation of a flow medium. FIG. 3 shows a zone for the transport of a flow medium, said zone comprising a device for the generation of finite edge vortices 6. As can be seen in FIG. 3a, a plurality of profiles 1, for example three, which execute a periodic movement in synchronism are arranged in a flow duct 12. The periodic movement may consist of a rotation through the angle φ about an axis of rotation 14 or else of a combination of the rotation with a periodic displacement of the profile 1. In each case two finite edge vortices 6 occur in each period at the respective trailing edges 4 of the profiles 1 oscillating in synchronism. The energy transmitted to the flow medium S by the profiles 1 as a result of vortex formation is utilized for the transport of the flow medium S through the flow duct 12. If the profiles 1 execute a pure rotational movement, they can be driven by means of the external drive illustrated in FIG. 3b. For this purpose, the profiles 1 are mounted in the region of their trailing edge 4 on a connecting rod 23 which is connected to a crank drive 26 via an articulated lever 24. When the vortex generator is operating, the crank drive 26 moves the connecting rod 23 up and down and thus drives the rotation of the profiles 1 about their respective axis of rotation 14.

If, by contrast, the profiles 1 execute a combination of a translational and rotational movement, they can be driven by means of the external drive illustrated in FIG. 3c. For this purpose, the drive device illustrated comprises a connecting rod 23, on which the profile or profiles 1 are mounted in their rear region, and also a further connecting rod 30 which connects the profiles 1 to one another in their front region. When the device is operating, both the connecting rod 23 and the further connecting rod 30 execute a periodic movement in the upward and downward direction which is brought about by an electromagnetic drive 27 and via a further electromagnetic drive 28, respectively. In order to achieve a rotation of the profiles 1 about the axis of rotation 14, the electromagnetic drive 27 and the further electromagnetic drive 28 do not operate in phase. Instead, the electromagnetic drive 27 may have a phase lead of 90 degrees with respect to the further electromagnetic drive 28. The profiles 12 thus execute a combination of a translational movement over the distance x and a rotational movement through the angle $\phi$ within the flow duct 12.

Owing to the use of the device illustrated in FIG. 3 through a flow duct 12, the flow medium S can be transported especially efficiently through a flow duct 12. To be precise, as calculations within the framework of the "finite edge vortex model" have yielded, the periodic movement of the profiles 1 ensures that energy is transmitted from the profiles 1 to the flow medium S especially efficiently. In particular, the throughput of flow medium S through the flow duct 12 in relation to the pressure loss can thereby be maximized.

For the efficient transport of a flow medium S through a flow duct 12, profiles 1 oscillating in countersynchronism, such as are illustrated in FIG. 4, are also suitable. FIG. 4a shows an alternative zone for the efficient transportation of a flow medium S. Within a flow duct 12, a further flow duct 16 is arranged, for example concentrically, at the exit of which is arranged a pair of profiles 1 which in each case execute periodic rotational movements. For this purpose, they oscillate in countersynchronism, that is to say with a phase displacement of 180 degrees, and at their trailing edge 4 generate per period in each case two finite edge vortices 6 which, after their adhesion phase, break away from the trailing edges 4 and generate a wake 18 in the flow duct 12. In technical applications, it may be beneficial, for example for utilizing the residual wake energy, to destroy the broken-away vortices completely or partially again. For this purpose, the profiles 1 may be followed on the flow medium side by a vortex destroyer, not illustrated in FIG. 4.

FIG. 4b shows a drive suitable for operating the vortex generator illustrated in FIG. 4a. For this purpose, the drive comprises an electromagnetic drive 27, which activates a hydraulically operating working cylinder 32, and two articulated levers 24 which are mounted on the profiles 1 and, via their movement caused by the working cylinder 32, bring about a rotation of the profiles 1 about their respective axis of rotation 14.

Figure 5:
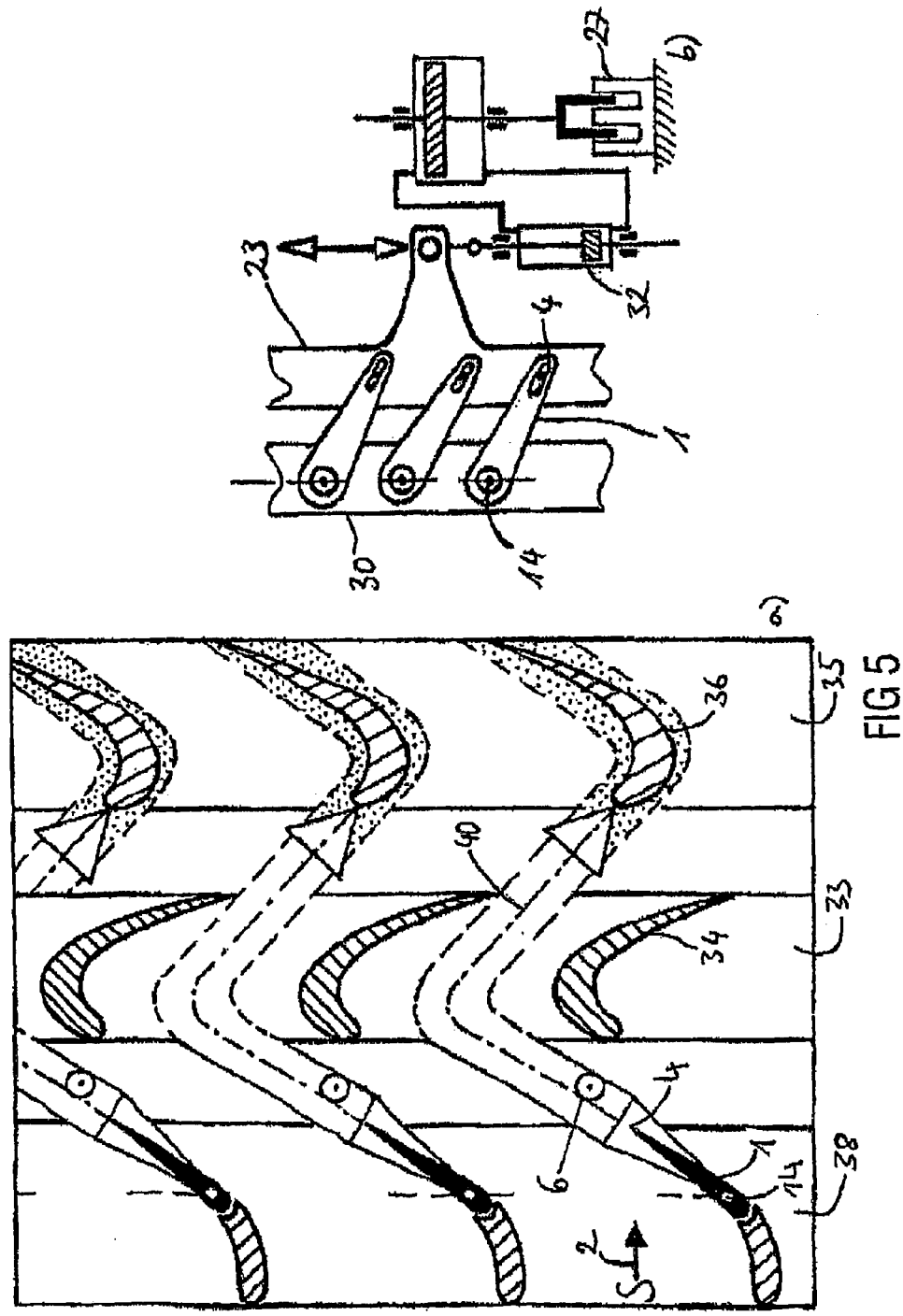
FIG. 5 shows a cylindrical section, unrolled into the plane, through a guide-vane and moving-blade row of a gas turbine, said row being preceded by a device for the generation of vortices.

In addition to the efficient transport of a flow medium, active vortex generators may also be employed in various other technical fields. FIG. 5 illustrates the principle of use of active vortex generators for increasing the efficiency of a cascade flow. For this purpose, an axial cascade, illustrated in FIG. 5a by a cylindrical section unrolled into the plane, is preceded by a number of active vortex generators. FIG. 5a shows a guide-vane row 33 of a gas turbine, which comprises a number of guide vanes 34 and which is followed on the flow medium side by a moving-blade row 35 comprising a number of moving blades 36. The guide-vane row 34 and the moving-blade row 36 are arranged in the flow duct, not illustrated in any more detail, through which the flow medium S flows in the direction indicated by the arrow 2. The guide-vane row 34 is preceded on the flow medium side by a vortex generator row 38 which comprises a number of profiles 1. The profiles 1 are designed in such a way that they are rotated about their respective axis of rotation 14 by an external drive. During a full oscillation period of the profiles 1, each profile 1 generates at its trailing edge 4 two finite edge vortices 6 which break away after the adhesion phase and move through the flow duct on the path indicated by the arrow 40. The finite edge vortices 6 move on their path around the guide vanes 34 due to the energy transmitted to them by the profiles 1 and impinge onto the moving blades 36 which follow the guide vanes on the flow medium side and to which said vortices discharge their energy. The flow pulses thereby generated increase the efficiency of the cascade flow, inter alia due to the utilization of the not yet fully understood "clocking effect" as it is known, an effect which is based on the aerodynamic interaction of various cascades with one another and which comes into force when the cascades assume an exactly defined position with respect to one another. The clocking effect already utilized in the positioning of the guide vanes 34 in relation to the moving blades 36 is further intensified by the profiles 1 as a result of the generation of flow pulses generated so as to match the movement of the moving blades 36 in duration and frequency. Said effect measurably increases the efficiency of the cascade flow and can thus contribute to the increase in efficiency of, for example, a gas turbine and consequently to the lowering of its emissions.

FIG. 5b shows a possible drive for the profiles 1 illustrated in FIG. 5a. The profiles 1 are mounted on a common connecting rod 23 in the region of their trailing edge 4 and are supported rotatably about their respective axis of rotation 14 in their front region on a further connecting rod 30. When the vortex generator is operating, the electromagnetic drive 27 moves the connecting rod 23 upward or downward via the hydraulically operating working cylinder 32. This results in an in-phase rotation of the profiles 1 about their respective axis of rotation 14.

Figure 6:
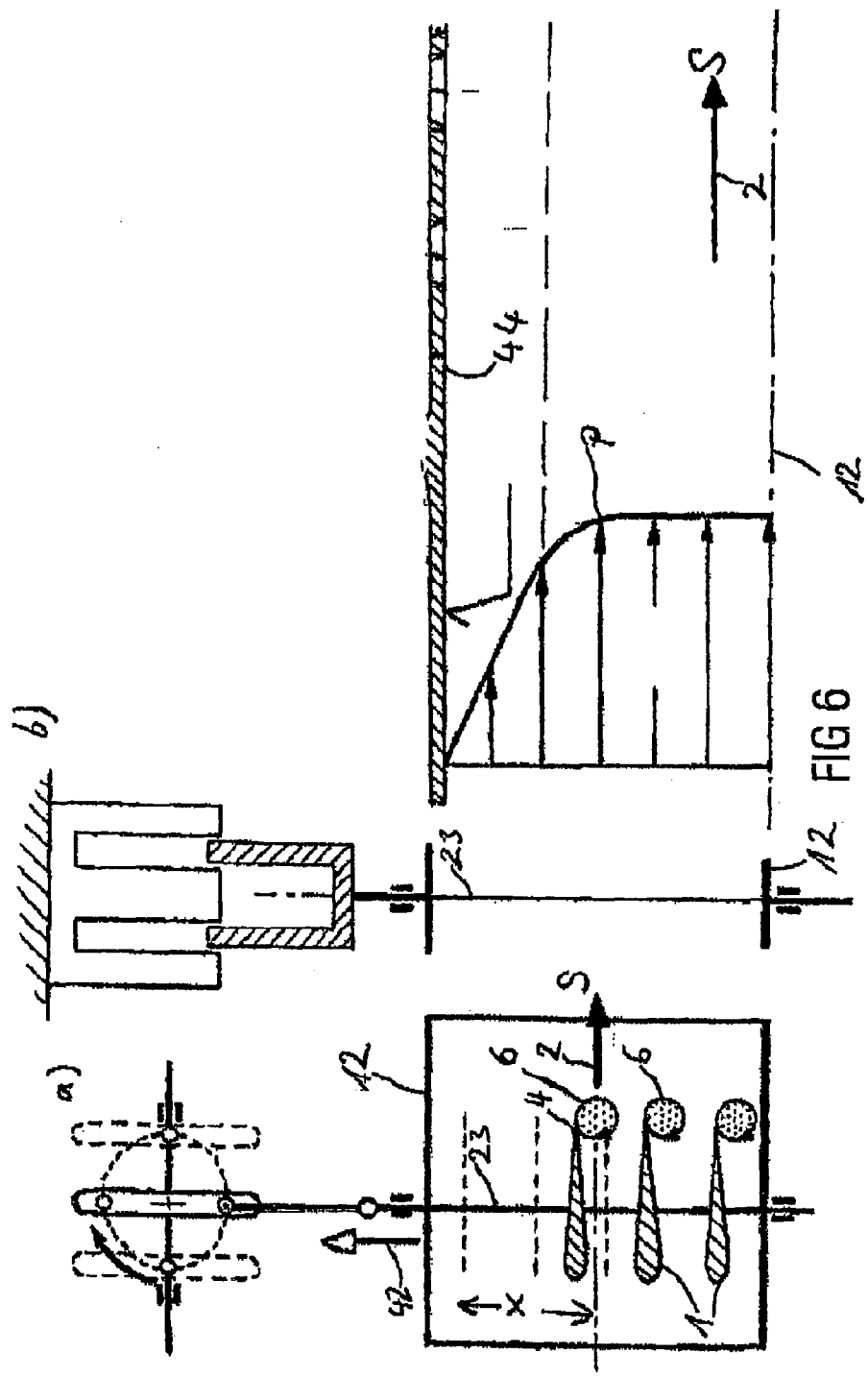
FIG. 6 shows a device for the cooling of components subjected to high thermal load.

The heat exchange and mass transfer in a flow medium transversely to its flow direction can be increased considerably by means of velocity fluctuations imparted to the flow medium. Such velocity fluctuations can be imparted especially simply, and with a comparatively low pressure loss in the flow medium, by the use of active vortex generators. FIG. 6 shows an arrangement in which finite edge vortices 6 generated by the profiles 1 can be utilized for the cooling of components subjected to especially high thermal load. For this purpose, a number of profiles 1, for example three profiles 1, are arranged on a common connecting rod 23 in a flow duct 12 of, for example, a gas turbine. The connecting rod 23 can be periodically moved upward in the direction indicated by the arrow 42 and subsequently downward again by means of an external drive. The drive of the connecting rod 23 may in this case take place mechanically, as in FIG. 6a, or alternatively electromagnetically, as in FIG. 6b. When operating, on account of the external drive, the profiles 1 execute a translational movement over the distance x within the flow duct 12 and thereby impart the velocity profile p to the flow medium S. The finite edge vortices 6 occurring at the moved trailing edges 4 of the profiles 1 and breaking away from the profiles 1 impart in turn to the velocity profile p periodic velocity fluctuations which considerably increase the heat exchange transversely to the flow direction and thus contribute to the desired improvement in the cooling of the wall 44. In particular, the improvement in the cooling action of the flow is attributable to the upstream displacement of the laminar/turbulent reversal point of the flow due to the use of the vortex generator. The heat transmission coefficient is thereby markedly increased and the cooling action improved. Thus, with the temperature of the wall 44 remaining the same, flow medium S can be saved or, at the same outlay of flow medium S, an increase in power and efficiency of the gas turbine can be achieved.

Figure 7A:
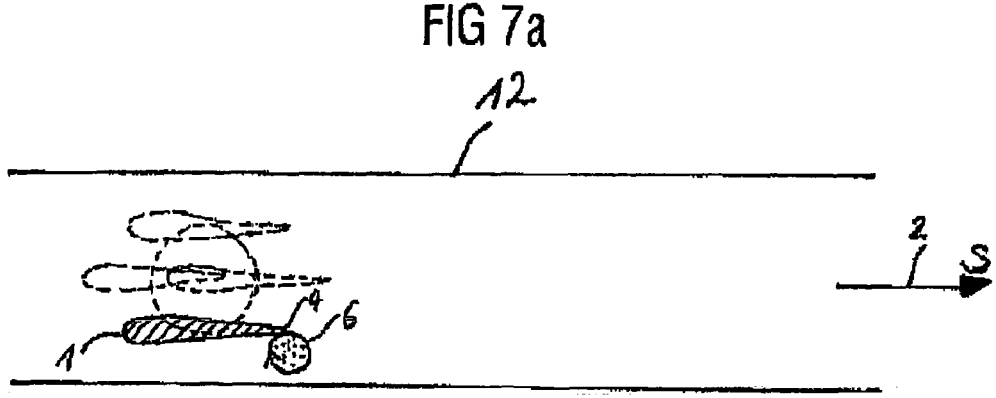
FIG. 7 shows a device for the mixing of a flow medium.
Figure 7B:
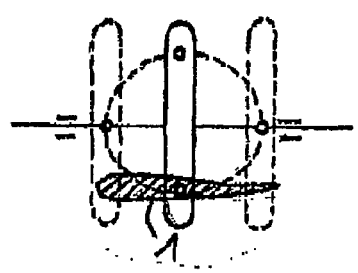

The mass transfer transversely to the flow direction, increased as a result of the use of a vortex generator, may also be utilized for the mixing of flow media with one another. For this purpose, as illustrated in FIG. 7a, a profile 1, which is moved periodically by means of an external drive, is arranged in a flow duct 12 through which a flow medium S flows in the direction of the arrow 2. In this case, as illustrated in FIG. 7b, the drive takes place mechanically via a slider crank. During each period, the periodically moving profile 1 generates two finite edge vortices 4 which occur at its trailing edge 4 and which break away after the adhesion phase. The turbulences thereby generated in a controlled manner ensure an efficient mixing of the flow medium S which may consist, for example, of a plurality of components, such as air and fuel gas or light fuel oil and water, which are to be intermixed with one another. Where a gas turbine is concerned, by virtue of the especially thorough intermixing of fuel gas and air, a complete combustion of the fuel gas and consequently a lowering of the NOx emissions of the gas turbine can be achieved. The profile 1 for the generation of vortices may be followed on the flow medium side by a profile, not illustrated in FIG. 7, for the destruction of vortices, if a turbulent flow in the further progression is not desired.

The invention claimed is:

1. A device for the generation or destruction of eddies in a flow medium, comprising:
 a profile having a leading and a trailing edge and arranged in a flow duct having an axis of flow direction such that the flow medium flows around the profile; and
 an external drive in mechanical communication with the profile and adapted to provide the profile with periodic translational movement back and forth along an axis perpendicular to the flow direction axis;
 wherein the movement by the external drive upon the profile is effective to form finite edge vortices along the trailing edge during passage of flow medium in the flow ducts,
 wherein the external drive is adapted to additionally communicate a pivoting movement of the profile that results from a rotation of the profile about an axis of rotation that is perpendicular to the flow direction of the flow medium through an angle $\phi$, and
 wherein the flow duct has two profiles arranged within that oscillate with the same angular frequency $\omega$ and in countersynchronism about their respective axes of rotation and the axes of rotation are oriented parallel to each other.

2. The device as claimed in claim 1, wherein the device is followed by a second profile arranged on a flow medium side, for the destruction of vortices.

3. A device for the generation or destruction of eddies in a flow medium, comprising:
 a profile having a leading and a trailing edge and arranged in a flow duct having an axis of flow direction such that the flow medium flows around the profile; and
 an external drive in mechanical communication with the profile and adapted to provide the profile with periodic translational movement back and forth along an axis perpendicular to the flow direction axis; and
 wherein the movement by the external drive upon the profile is effective to form finite edge vortices along the trailing edge during passage of flow medium in the flow ducts,
 wherein the external drive is adapted to additionally communicate a pivoting movement of the profile that results from a rotation of the profile about an axis of rotation that is perpendicular to the flow direction of the flow medium through an angle $\phi$, and
 wherein the external drive comprises a first drive to effectuate the periodic translational movement back wad forth along an axis perpendicular to the flow direction axis and a second drive to effectuate rotation of the profile about an axis of rotation that is perpendicular to the flow direction.

4. The device as claimed in claim 3, wherein the device comprises a plurality of profiles that execute the periodic pivoting movement with the same angular frequency $\omega$ and the same phase and is arranged in a flow duct of a conveying zone for the transport of the flow medium.

5. The device as claimed in claim 3, wherein the device is located in a gas turbine.

6. An axial cascade device comprising in axial flow series:
 a vortex generating row comprising a plurality of vane members each comprising a rotatable profile arranged in a flow duct such that a flow medium flows around the profile, each profile adapted to rotate about a respective axis of rotation by an external drive,
 a row of stationary vanes arranged offset from a projected path of vortices generated by the respective rotatable profiles, and
 a row of moving blades,
 wherein the external drive rotates the respective profiles for displacement of the vortices responsive to movement of the moving blades.

7. The axial cascade device of claim 6, wherein the profiles are mounted on a first common connecting rod in the region of their respective trailing edges, and the first common connecting rod is in driven relationship to a second connecting rod driven in a back and forth movement by the external drive.

8. The axial cascade device of claim 6, wherein the vane members additionally comprise a respective stationary member disposed upstream and adjacent an upstream end of each profile.

* * * * *